United States Patent [19]

Lee

[11] Patent Number: 4,707,137

[45] Date of Patent: Nov. 17, 1987

[54] DEVICE AND METHOD FOR TESTING THE WAVE FRONT QUALITY OF OPTICAL COMPONENTS

[75] Inventor: Wai-Hon Lee, Cupertino, Calif.

[73] Assignee: Laser Magnetic Storage International Company, Colorado Springs, Colo.

[21] Appl. No.: 791,421

[22] Filed: Oct. 25, 1985

[51] Int. Cl.$^4$ .............................................. G01B 9/02
[52] U.S. Cl. ................................... 356/353; 356/354; 356/359
[58] Field of Search ............... 356/353, 354, 355, 356, 356/359, 360

[56] References Cited

U.S. PATENT DOCUMENTS

| | | | |
|---|---|---|---|
| 3,829,219 | 8/1974 | Wyant | 356/107 |
| 3,904,295 | 9/1975 | Hock et al. | 356/167 |
| 4,180,830 | 12/1979 | Roach et al. | 358/128 |
| 4,236,823 | 12/1980 | Roach et al. | 356/351 |
| 4,340,305 | 7/1982 | Smith et al. | 356/356 |
| 4,344,707 | 8/1982 | Massie | 356/354 |
| 4,363,118 | 12/1982 | Roach | 369/58 |
| 4,492,468 | 1/1985 | Huignard et al. | 356/107 |

OTHER PUBLICATIONS

Patorski et al., "Collimation Test by Double Grating Shearing Interferometer", *Applied Optics*, vol. 15, No. 5, pp. 1234-1240, 5/76.

Schmutz et al., "Integrated Imaging Irradiance (I$^3$) Sensor: A New Method for Real-Time Wavefront Measuration, *Proc SPIE*, vol. 179, pp. 76-80, 1979.

*Primary Examiner*—Davis L. Willis
*Assistant Examiner*—Matthew W. Koreu
*Attorney, Agent, or Firm*—Sheridan, Ross & McIntosh

[57] ABSTRACT

A device and method for testing the wave front quality of an optical component. The device is a shearing interferometer having two gratings to split and recombine a wave front beam to form interference fringes. The pattern of the fringes provides a means for measuring collimation error, astigmatism, and coma present in the beam.

13 Claims, 12 Drawing Figures

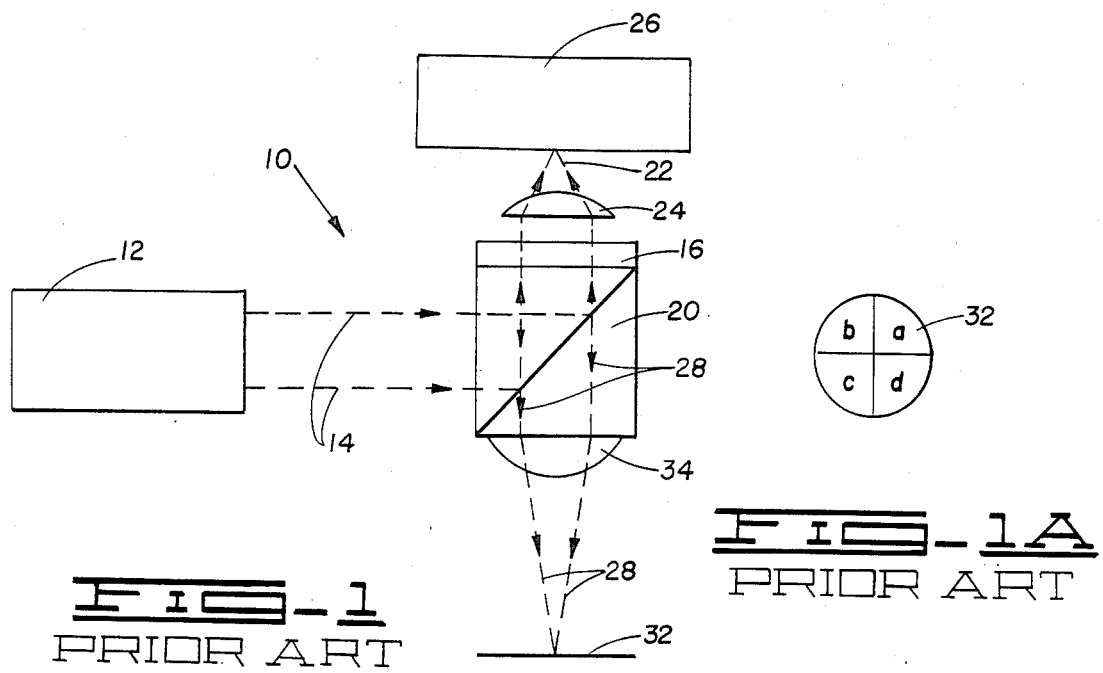
FIG-1 PRIOR ART
FIG-1A PRIOR ART
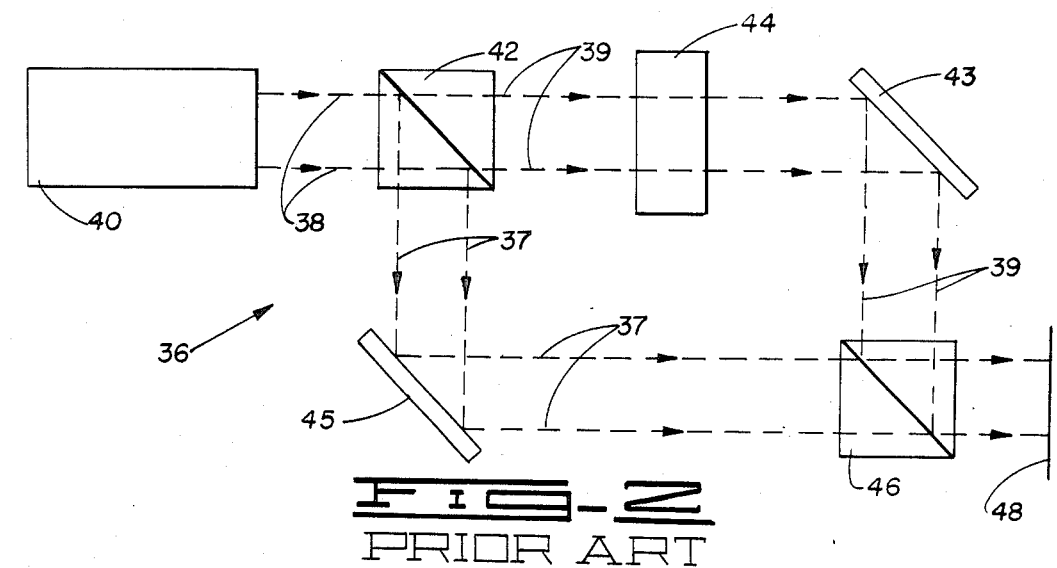
FIG-2 PRIOR ART
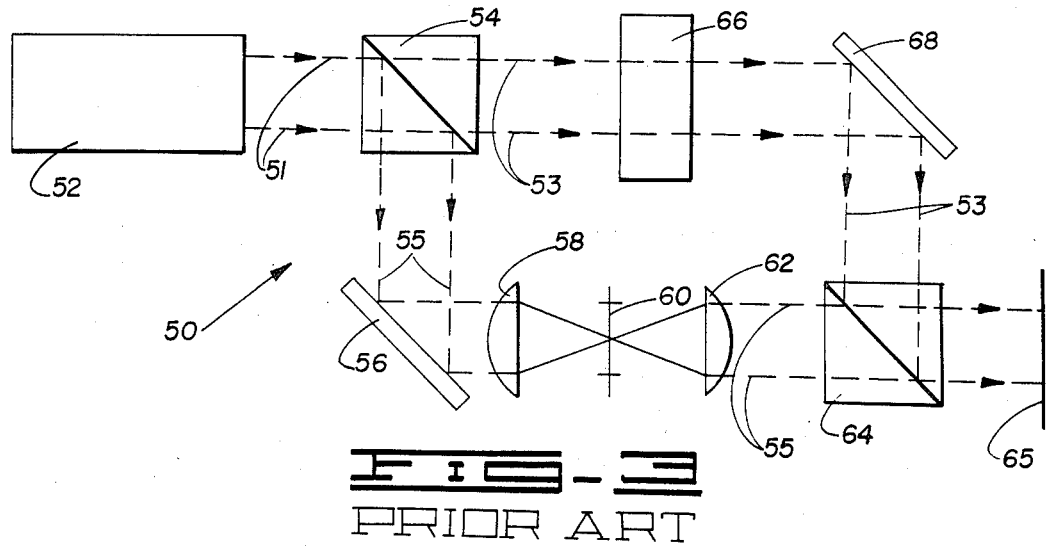
FIG-3 PRIOR ART

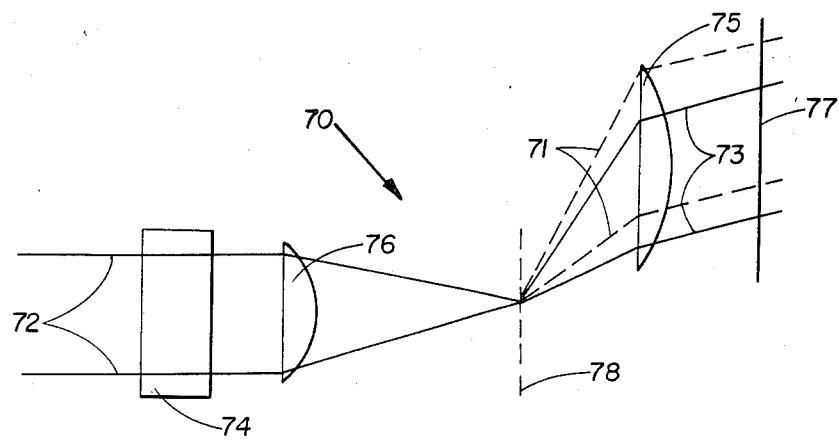
FIG-4
PRIOR ART
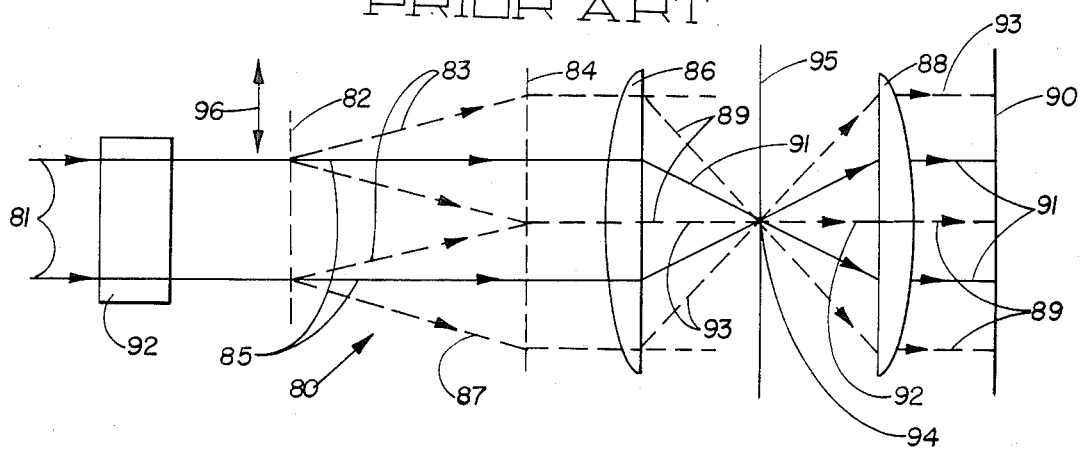
FIG-5
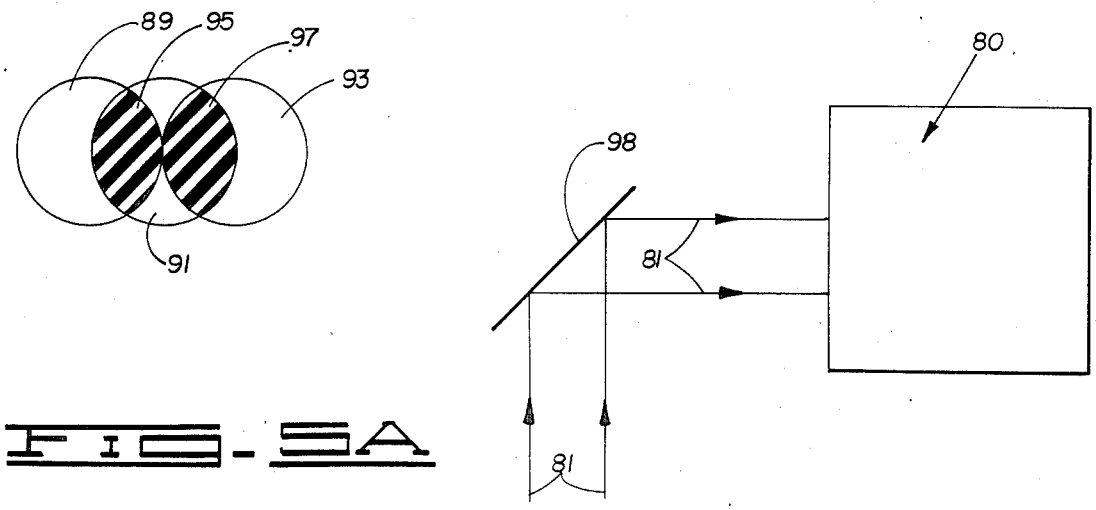
FIG-5A
FIG-6

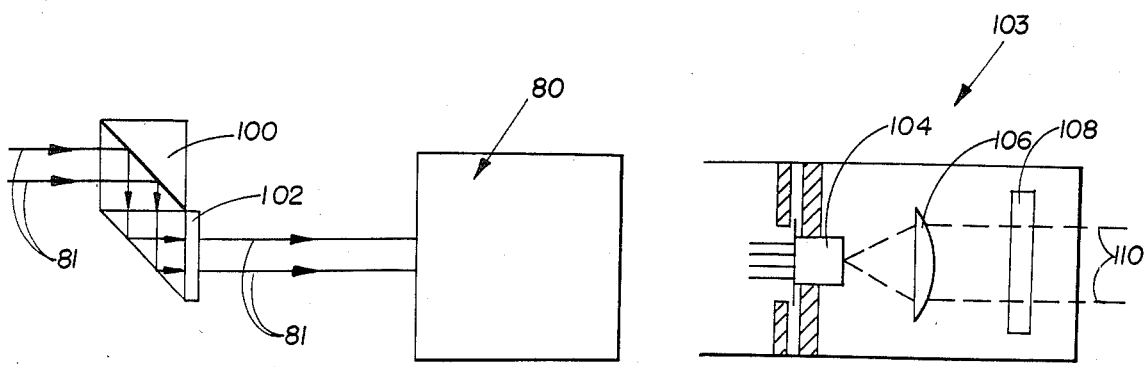
FIG-7
FIG-8
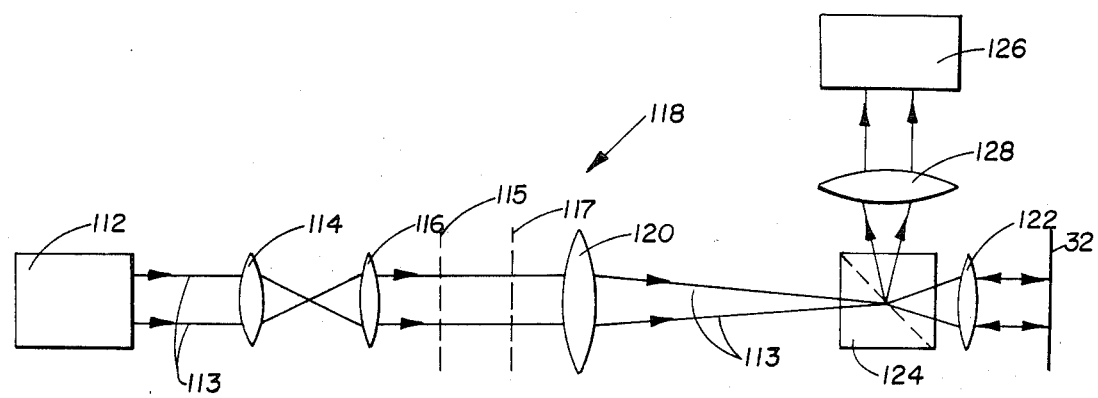
FIG-9
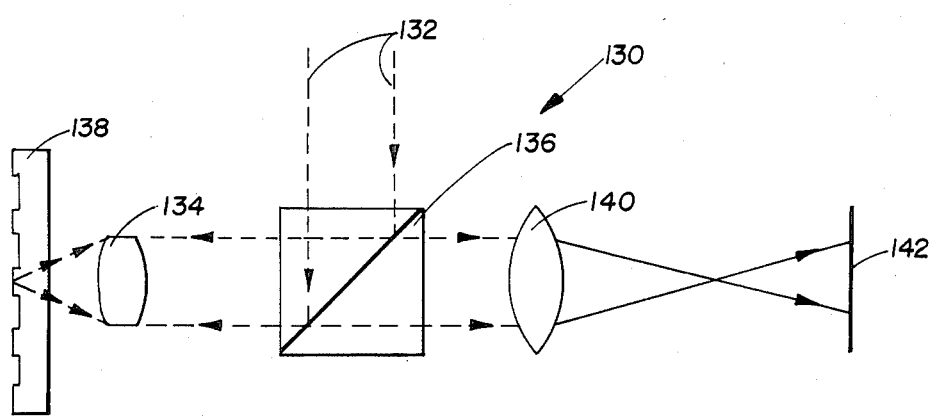
FIG-10

DEVICE AND METHOD FOR TESTING THE WAVE FRONT QUALITY OF OPTICAL COMPONENTS

BACKGROUND OF THE INVENTION

This invention relates to an interferometer for measuring the wave front qualities of components used in optical data storage systems and more particularly, but not by way of limitation, to an interferometer which can be used to measure wave front qualities of collimated laser sources such as collimator pens having semiconductor diode lasers. Also, the invention can be used as a guide for alignment of optical components such as the collimating objective lens and cylindrical lens in the manufacturing of collimators pens.

In optical data storage systems, a light beam from a coherent light source such as a gas laser or semiconductor laser is focused on a spot having a diameter of 1 micrometer or less. This intense light beam is used to ablate holes on metallic thin films such as telurium coated on a substrate material as a means for storing digital information for computer applications. In order to obtain a small focus light spot to record information, optical components used to shape the light beam must have high optical qualities. Therefore, it is necessary to use an instrument to qualify these optical components before they are put into an optical data storage system.

In the testing of optical components for optical disc drives there are two requirements. One is to find a practical standard for acceptable optical quality. The second is to find test equipment that can perform proper measurements. The quality of an optical surface is usually defined by its closeness to an ideal surface. Therefore, in optical testing, an interferometer is used to compare the optical surface under test with a test plate. The difference between the two surfaces shows up as a distortion in interference fringes. By means of a computer, a two-dimensional plot can be extracted of the phase difference between the two surfaces from their interference fringes. Also, a figure of merit cna be obtained in the terms of its RMS (i.e. root mean square), deviation from the test plate. Although a phase plot of the surface gives the information about its surface, it is not easy to examine the phase plot and predict its performance in a system.

Currently, two different types of interferometers are used to check the optical qualities of incoming optical components. One interferometer is used to test mirrors, beam splitters and other objects under test. The second interferometer is built to test laser pens. A toric lens used in an optical subsystem is tested in a different set-up for the quality of its astigmatic focal lines. It is time consuming to use these two interferometers to measure the qualities of optical components. Moreover, the results of the tests are not in a form that an inexperienced operator can use readily to qualify optical components.

It has been found that the optical subsystem in the optical disk drive can be a critical tester for optical components. The optical subsystem has similar properties as an interferometer. The pregrooves on the optical disk split the incoming beam into three beams so that the beams upon returning through the objective lens interfere and generate radial push/pull signals at the location of a quadrant detector. Any asymmetry in the wave front incident on the disk can cause the signals at each detector on the quadrant detector to be out of phase with respect to one another. This produces crosstalk in the focus error signals. Phase differences as high as 80 degrees have been observed. It has also been observed that when the phase difference was about 20 degrees the crosstalk was less than 5 percent. The fact that a 20 degree phase delay can be measured in signals from the quadrant detector means that the phase asymmetry can be measured in the wave front as small as 1/18 of wavelength of light. Therefore, an interferometer based on the same concept as the optical subsystem in an optical disk drive can be a powerful test instrument for qualifying incoming optical components. This conclusion led to the subject invention as described herein.

In the following United States Patents, U.S. Pat. No. 3,829,219 to Wyant, U.S. Pat. No. 4,474,467 to Hardy, et al, U.S. Pat. No. 3,904,295 to Hock, et al, U.S. Pat. No. 4,180,830 to Roach, U.S. Pat. No. 4,236,823 to Roach et al, U.S. Pat. No. 4,340,305 to Smith, et al, U.S. Pat. No. 4,363,118 to Roach, et al, U.S. Pat. No. 4,492,468 to Huignard et al and U.S. Pat. No. 4,344,707 to Massie, various types of shearing interferometers and wave front sensors are disclosed. None of them provide the unique features and advantages of the subject wave front quality measurement device as described herein.

SUMMARY OF THE INVENTION

The subject invention provides for testing the wave front qualities of optical components by using two gratings to split and combine a wave front beam to form interference fringes. The fringe patterns provide a means for measuring collimation error, astigmatism, and coma present in the beam.

The device also provides for a quadrant detector for exhibiting phases which can give a pass or fail determination of laser collimator pens and the like.

Rather than using RMS deviation or phase plots, phase errors in the four quadrants of an quadrant detector can be used for examining the beams wave front. With these numbers, the component under test can be qualified and also components can be matched to give the smallest crosstalk.

The subject invention and the alternate embodiments of this invention can be built as test equipment for incoming inspection of optical components. The subject interferometer is simple in design and requires far less adjustments than other types of previously used interferometers.

The device uses a vibrating grating to split an incoming beam. The beam may be a laser beam from a laser collimator pen. The object under test is positioned along the beam path. A simple spherical lens is used to image the aperture of the laser collimator pen on a quad detector. The grating is oscillated in a direction perpendicular to the fringes on the grating. The movement of the grating produces a time bearing signal at the four detector quadrants. Whenever a phase distortion in a particular quadrant of the wave front appears, this distortion will show as a phase delay in the signal with respect to the signals from other quadrants. The quality of the object under test is then determined on the basis of the phase difference between the four quadrants. The smaller the phase difference, the better the quality of the object under test.

The advantages and objects of the invention will become evident from the following detailed description of the drawings when read in connection with the accompanying drawings which illustrate preferred embodiments of the invention.

BRIEF DESCRIPTION OF THE DRAWINGS

FIG. 1 and FIG. 1A illustrate a prior art optical recording head and quadrant detector used in an optical data storage system.

FIG. 2 illustrates a prior art optical recording subsystem.

FIG. 3 illustrates a variation of a prior art interferometer.

FIG. 4 illustrates another type of a prior art interferometer.

FIG. 5 and FIG. 5A illustrate the subject invention for testing wave front quality of an optical component.

FIG. 6 illustrates the subject interferometer modified to test a mirror.

FIG. 7 illustrates the subject interferometer for testing a beam splitter.

FIG. 8 illustrates components used in a collimated laser source.

FIG. 9 illustrates an alternate embodiment of the subject wave front testing device.

FIG. 10 illustrates another embodiment of the subject invention.

DETAILED DESCRIPTION OF THE DRAWINGS

In FIG. 1 a prior art typical optical recording subsystem is shown and designated by general reference numeral 10. The subject device 10 is used in an optical data storage system and includes a collimator laser pen 12 which contains a semiconductor laser and optical components to produce a collimated or parallel beam 14 of light. A quarter wave retardation plate 16 is bonded to a surface 18 of a polarizing beam splitter 20 for providing linear polarized light which is converted to a beam 22 with circular polarization. The light beam 22 is focused by a lens 24 onto a recording medium 26. Upon returning from the recording medium 26, the light beam 22 is again converted to a linear polarized beam 28 using the quarter wave retardation plate 16. The polarization of the returned beam 28 is rotated 90 degrees from the original beam 22. With the change in the polarization, the return beam 28 is transmitted through the polarization beam splitter 20 to reach a detector 32. A toroidal lens 34 is used to produce signals at the detector 32 for the purpose of maintaining a focused spot at the medium surface.

When the wave front qualities of the aforementioned components are not satisfactory, the diameter of the focused spot on the recording surface of the detector 32 would be larger than one micrometer needed by the device 10. Moreover, the wavefront error can reduce the magnitude of the error signals detected by the detector 32 or even produce erroneous focus error signal. FIG. 1A illustrates a typical quadrant detector which could be used as the detector 32 and having quadrants a, b, c, and d.

In FIG. 2 a prior art interferometer designated by general reference numeral 36 is shown which is commonly used for evaluating optical components such as glass plates and prisms. A collimated laser beam 38 from a laser light source 40 is divided into two beams 37 and 39 by a beam splitter 42. The beam 37 is used as a reference beam. The beam 39 is passed through an optical component under test 44. The two beams 37 and 39 are combined using mirrors 43 and 45 onto another beam splitter 46. The quality of the component under test 44 is displayed by a fringe pattern at an output plane 48. The laser source 40 used in the interferometer 36 must have a sufficiently narrow spectral width so the beam 39 after passing the component under test 44 is still within a coherent length of the other beam 37. The interference pattern can be used to determine the optical qualities of the component. However, if precise numerical evaluation is needed, the interference pattern has to be put into a computer for a detailed analysis.

FIG. 3 illustrates another variation of a prior art interferometer having a general reference numeral 50. This interferometer 50 is intended for testing laser sources. A collimated beam 51 from a laser source 52 under test is divided into two paths 53 and 55 by beam splitter 54. One path 55 of the beam 51 is reflected by a mirror 56 and is focused by a lens 58. At the focal plane of the lens 58, a spatial filter 60 is used to generate a fine quality reference beam. Typical diameter of the spatial filter is about 20 micrometers. After the beam is recollimated by a lens 62, the two beams 53 and 55 are combined by a beam splitter 64 onto output plane 65. Because some of the solid state lasers have a finite spectral width, the path length of the two beams 53 and 55 must be matched carefully in order that the interference can take place. This can be done by a lens system 66 and a mirror 68 with beam 53 received thereon.

In FIG. 4 still another type of prior art interferometer is shown and designated by general reference numeral 70 and called a shearing interferometer. This interferometer 70 provides a collimated beam 72 which passes through an optical component under test 74 and focused by a lens 76 on a holographic grating 78. The grating 78 contains at least two slightly different spatial frequencies. The holographic grating 78 will produce two slightly displaced overlapping beams 71 and 73. The overlapping beams 71 and 73 are recollimated by another lens 75 to project an interference pattern onto a screen or output plane 77. As can be seen in this figure, the beam 72 under test passes through the focusing lens 76 before the beam is used to produce an interference pattern. As a result, the lens 76 must be of very high quality so as not to add more error to the beam under test.

The interferometers discussed in the above figures are commonly used in testing optical components. They are not designed for the purpose of aligning optical components in the manufacturing of collimator pens.

It has now been discovered that the quality of laser sources or optical components can be evaluated by splitting a beam under test by a parallel line grating into three beams. The three beams are then redirected to propagate along the optical axis by means of a second grating having the same spatial frequency. the interferences produced by three beams can either be observed by an output device or detected by the quadrant detector 32 shown in FIG. 1A. The interference pattern or the waveform from the quadrant detector 32 can be used to determine the quality of the beam under test. Because the test pattern is produced by the interference of the main object beam with two displaced beams, this type of interferometer is also a form of shearing interferometer. The signal detected by the quadrant detector 32 is similar to signals detected in an optical data storage system where the recording disk contains concentric or spiral grooves.

The wavefront testing and alignment device shown in FIG. 5 and designated by general reference numeral 80 is composed of a collimated laser beam 81, two gratings 82 and 84, and lenses 86 and 88. The position of lenses 86 and 88 are symbolically illustrated in FIG. 5. The exact positions of 86 and 88 are determined by the positions of the object under test and the position of the observation plane. An output device 90 could be a television camera or a quadrant detector 32. The laser beam 81 passes through an optical component 92 under test and is incident on grating 82. The grating 82 diffracts the light beam into three main diffracted orders 83, 85 and 87. These three diffracted orders are again diffracted by the second grating 84 into nine beams. Of these nine beams, three beams 89, 91 and 93, propagate along an optical axis 92 and exhibit interference as shown in FIG. 5A. To improve the visibility of the interference pattern, the lenses 86 and 88 are used to image the laser beam 81 through an aperture 94 in an aperture plate 95 to the imaging output device 90. The aperture 94A is also used to isolate the desired beams from the other diffracted beams. The first grating 82 is sitting on a motorized stage indicated by arrow 96. During testing the stage 96 causes the grating 82 to travel across the beam 81. The motion of the grating 82 produces motion in the interference fringes 95 and 97 in FIG. 5A.

The interpretation of the fringes 95 and 97 pattern for a data storage application is rather simple. When more than one irregular fringe is being observed in any part of the fringe pattern the component under test 92 should be rejected. However, if the fringes 95 and 97 are in a vertical direction, it means that the optical component causes the beam 81 to take on a curvature. It is then necessary to rotate the component 92 by 90° to examine the qualities of the component 92 along the other axis. If the same number of vertical fringes are observed, this means that the beam 81 passing through the optical component 92 is no longer collimated or parallel. On the other hand, if the number of fringes 95 and 97 along the two axis are not the same, it means that the component 92 suffers from a wavefront error called astigmatism. FIG. 5A shows that the fringes are slanted at an angle. This is an indication that there is astigmatism in the wavefront of the test object. It is also possible to observe fringes that are curved such as a parabola. In such cases coma in the wavefront can be suspected. When there is less than a fringe observed, the motion of the fringes 95 and 97 is then used for judging the qualities of the component 92. For an optical data storage application it is preferable to have motion along the horizontal axis rather than vertical motion. Fringes 95 and 97 with partial motion along the vertical direction as shown in FIG. 5A are indications of astigmatism or coma in the wavefront qualities of the component under test 92. The use of the quadrant detector 32 as the image detector 90 provides a very sensitive means of measuring very minute motion in the fringes. Whenever there is a motion in the vertical direction, the phase of the waveforms coming from the a and d quadrants of the detector 32 will be different. Typically a phase difference of more than 40° is a cause for rejection of the components for a data storage application.

There are many advantages to the device 80 as shown. The main advantage is the simple interpretation of the test results as related to an optical data storage application. The laser source 81 used in this interferometer 80 is not required to have an extremely narrow spectral width. This makes it ideal for testing multimode solid state lasers where the spectral width can be of the order of 10 nm. Because the beams are only separated over a short distance separating the two gratings 82 and 84, the interference patterns 95 and 97 are not sensitive to mechanical vibrations, air currents, or thermal variation of the air surrounding the test setup.

FIG. 6 illustrates how the interferometer 80 in FIG. 5 is modified to test a mirror 98. FIG. 7 shows the testing of a beam splitter 100 assembly with a quarter waveplate retarder 102 bonded to one of its surfaces. Although the quarter waveplate retarder 102 changes the polarization of the beam 81 into a circular polarization, the interferometer 80 is not influenced in any way by the polarization of the light beam 81. This is a major departure from the other interferometers 10, 36, 50 and 70 described in the above prior art drawings.

The interferometer shown 80 can also be used to assembly collimated laser sources such as shown in FIG. 8 and given general reference numeral 103. These laser sources are consisted of a semiconductor laser 104, a collimating objective lens 106, and a cylindrical lens 108. To produce a highly collimated beam 110 without wavefront errors with these three parts, it is necessary to position the objective lesn 106 at a proper distance from the laser diode 104. The cylindrical lens 108 must also be rotated properly with respect to the axis of the laser diode 104. These two adjustments can be observed directly fromviewing the fringe patterns at the output plane or detector 90 of the device 80 shown in FIG. 5. In aligning the parts of the assembly 103, it is placed in front of the wavefront measuring device 80. The lens 106 is adjusted until only three or four fringes such as shown in FIG. 5A are observed in a fringe pattern. Then the cylindrical lens 108 is rotated until the slanted fringes in FIG. 5A are in a vertical direction. At this point the lens 106 is adjusted until there is less than one fringe pattern. At this point both lens 106 and 108 are fixed by glue or by laser welding.

In FIG. 9 another embodiment of the wavefront testing device 80 is shown for testing a collimator pen 112. The laser pen 112 under test is positioned before a telecentric system consisting of lenses 114 and 116. A laser beam 113 after passing through this lens system enters an interferometer section having general reference numeral 118 and having first and second gratings 115 and 117. In this embodiment lenses 120 and 122 are used to image an interference pattern onto the quadrant detector 32. The fring motion in each quadrant a, b, c and d are detected and can be displayed on an oscilloscope. The oscilloscope is not shown in the drawings. The light beam 113 incident on the detector is reflected by the surface of the detector 32. By means of a beam splitter 124 the reflected beam is imaged on a video camera 126 thorough lens 128 displayed on a video monitor. The monitor is not shown in the drawings. The wavefront qualities of the laser pen 112 normally contain a number of known defects such as collimation error, astigmatism and coma. The telecentric lens system with lenses 114 and 116 is used to minimize the fringe pattern as a means to measure the collimation error and the astigmatism in the beam. The phase between the a and d quadrants of the detector 32 provide some information on the amount of astigmatism and coma present in the beam 113.

FIG. 10 illustrates another embodiment having numeral 130 of the wavefront measuring device 80. This embodiment simplifies the device 80 for measuring objective lenses. In this embodiment a laser beam 132 is introduced to an objective lens 134 under test by means of a beam splitter 136. The light beam 132 is focused onto a vibrating reflection grating 138. The spatial frequency of the grating 138 is approximately given by the formula $$spatial\ frequency = R/\pi F$$

where R is the radius of the objective lens 134, F is the focal length of the lens 134 and $\pi$ is the wavelength of the laser beam 132. The returned beam 132 from the reflection grating 138 is imaged by a lens 140 to an output device at plane 142. The criterion in judging the qualities is identical to those discussed above.

Changes may be made in the construction and arrangement of the parts or elements of the embodiments as described herein without departing from the spirit or scope of the invention defined in the following claims.

What is claimed is:

1. A device for testing the wavefront quality of an optical component under test, the device comprising:
   a collimated light source on one side of the optical component for passing a beam therethrough;
   a first grating on the other side of the optical component for receiving the beam thereon, the grating diffracting the beam into three main diffracted orders;
   a second grating disposed adjacent the first grating and receiving the three diffracted beams therethrough and diffracting these beams into nine beams, three of the nine beams propagated along an optical axis of the light source, the three beams along the optical axis overlapping each other for providing the interference fringes for viewing by the means for viewing; and
   means for viewing overlapping interference fringes of the three diffracted beams wherein said means for viewing overlapping interference fringes is useful for measuring the wavefront quality of said optical component.

2. A device for testing the wavefront quality of an optical component under test, the device comprising:
   a light source on one side of the optical component for passing a beam therethrough;
   a first grating on the other side of the optical component for receiving the beam thereon, the grating diffracting the beam into three main diffracted orders;
   means for viewing overlapping interference fringes of the three diffracted beams;
   a second grating disposed adjacent the first grating and receiving the three diffracted beams therethrough and diffracting these beams into nine beams, three of the nine beams propagated along an optical axis of the light source, the three beams along the optical axis overlapping each other for providing the interference fringes for viewing by the means for viewing; and
   a lens system for receiving the diffracted nine beams from the second grating and focusing these beams into an aperture of the light source and refocusing for viewing by the means for viewing.

3. A device for testing the wavefront quality of an optical component under test, the device comprising:
   a light source on one side of the optical component for passing a beam therethrough;
   a first grating on the other side of the optical component for receiving the beam thereon, said grating diffracting the beam into three main diffracted orders and said grating being set on a motorized stage, the stage when activated causing the first grating to move across the beam during testing; and
   means for viewing overlapping interference fringes of the three diffracted beams;

4. A device for testing the wavefront quality of an optical component under test, the device comprising:
   a light source on one side of the optical component for passing a beam therethrough;
   a first grating on the other side of the optical component for receiving the beam thereon, the grating diffracting the beam into three main diffracted orders; and
   quadrant detector means for viewing overlapping interference fringes of the three diffracted beams.

5. A device for testing the wavefront quality of an optical component under test, the device comprising:
   a light source on one side of the optical component for passing a beam therethrough;
   a first grating on the other side of the optical component for receiving the beam thereon, the grating diffracting the beam into three main diffracted orders; and
   video camera means for viewing overlapping interference fringes of the three diffracted beams.

6. A device for testing the wavefront quality of an optical component under test, the device comprising:
   a light source on one side of the optical component and passing a beam therethrough;
   a first grating on the other side of the optical component for receiving the beam therethrough, the grating diffracting the beam into three main diffracted orders;
   a second grating disposed adjacent the first grating and receiving the three main diffracted beams therethrough and diffracting these beams into nine beams, three of the nine beams propagated along an optical axis of the light source, the three beams along the optical axis overlapping each other for providing interference fringes;
   a lens system disposed adjacent the second grating and used to focus the three beams propagated along the optical axis; and
   an imaging output device disposed adjacent the lens system for receiving the image of the three propagated beams for viewing the overlapping interference fringes of these diffracted beams.

7. The device as described in claim 6 wherein the first grating is set on a motorized stage, when the stage is activated the first grating moves across the beam during the testing for producing motion in the interference fringes.

8. The device as described in claim 6 wherein the imaging output device is a quadrant detector for receiving the three propagated beams for viewing the overlapping interference fringes.

9. A device for testing the wavefront quality of an optical component under test, the device comprising:
   a light sources;
   beam splitter means for introducing a beam from said light source through the optical component;
   a vibrating reflection grating receiving the beam through the optical component and reflecting it therefrom; and
   a lens receiving the reflected beam from the grating and focusing diffracted beams onto an imaging output device for viewing overlapping interference fringes of the diffracted beams.

10. A device for testing the wavefront quality of a laser pen, the device comprising:
- a telecentric lens system having at least one lens for receiving the beam of the laser pen under test therethrough;
- a first grating for receiving the beam from the lens system, the grating diffracting the beam into three main diffracted orders;
- a second grating disposed adjacent the first grating and receiving the three main diffracted beams therethrough and diffracting these beams into nine beams, three of the nine beams propagated along an optical axis of the light source, the three beams along the optical axis overlapping each other for providing interference fringes;
- a second lens system disposed adjacent the second grating and used to focus the three beams propagated along the optical axis; and
- an imaging output device disposed adjacent the lens system for receiving the image of the three propagated beams for viewing the overlapping interference fringes of these diffracted beams.

11. A method for testing the wavefront quality of an optical component under test, the steps including:
- passing a collimated light source through the optical component and receiving the beam directly on a first grating;
- diffracting the beam by vibrating the first grating across the beam as it passes therethrough and into three main diffracted orders; and
- viewing the overlapping interference fringes of the diffracted beam for measuring collimation error, astigmatism, and coma.

12. A method for testing the wavefront quality of an optical component under test, the steps including:
- passing a light source through the optical component and receiving the beam on a first grating; diffracting the beam by vibrating the first grating across the beam as it passes therethrough and into three main diffracted orders;
- receiving the diffracted beam from the first grating on a second grating and diffracting the three beams into nine beams, three of the nine beams propagating along the optical axis of the light source and providing overlapping fringes for viewing thereof; and
- viewing the overlapping interference fringes of the diffracted beam for measuring collimation error, astigmatism, and coma.

13. The method as described in claim 12 further including the step of focusing the three propagated beams from the second grating through a lens system and onto a quadrant detector for viewing the overlapping interference fringes.

* * * * *